US012809003B2

(12) United States Patent
Wang et al.

(10) Patent No.: US 12,809,003 B2
(45) Date of Patent: Nov. 24, 2026

(54) BLOCKAGE DETECTION METHODS FOR LiDAR SYSTEMS AND DEVICES BASED ON PASSIVE CHANNEL LISTENING

(71) Applicant: VELODYNE LIDAR USA, INC., San Jose, CA (US)

(72) Inventors: Suqin Wang, San Jose, CA (US); Mathew Noel Rekow, Ben Lomond, CA (US); Pravin Kumar Venkatesan, Fremont, CA (US); Sunil Kumar Singh Khatana, Sunnyvale, CA (US); Meng-Day Yu, Freemont, CA (US)

(73) Assignee: Velodyne Lidar USA, Inc., San Jose, CA (US)

( * ) Notice: Subject to any disclaimer, the term of this patent is extended or adjusted under 35 U.S.C. 154(b) by 1242 days.

(21) Appl. No.: 17/558,165

(22) Filed: Dec. 21, 2021

(65) Prior Publication Data

US 2023/0194684 A1 Jun. 22, 2023

(51) Int. Cl.
*G01S 7/497* (2006.01)
*G01S 7/481* (2006.01)
*G01S 17/89* (2020.01)

(52) U.S. Cl.
CPC ............ *G01S 7/497* (2013.01); *G01S 7/4813* (2013.01); *G01S 7/4814* (2013.01); *G01S 7/4817* (2013.01); *G01S 17/89* (2013.01); *G01S 2007/4975* (2013.01)

(58) Field of Classification Search
None
See application file for complete search history.

(56) References Cited

U.S. PATENT DOCUMENTS 10,444,331 B1 * 10/2019 Lee ........................ G01B 11/25
2013/0062536 A1 * 3/2013 Bardos ............... G01N 21/9501 250/459.1
2016/0238698 A1 * 8/2016 Vuorenkoski-Dalgleish ............... G01S 17/10
2020/0174156 A1 * 6/2020 Terefe ..................... G01S 17/95
2022/0043128 A1 * 2/2022 Pacala ..................... G01S 17/89

FOREIGN PATENT DOCUMENTS

EP 3864429 B1 * 3/2025 ........... G01S 7/4817
JP S60149984 A * 8/1985 ............. G01S 7/481

* cited by examiner

*Primary Examiner* — Hovhannes Baghdasaryan
(74) *Attorney, Agent, or Firm* — Kilpatrick Townsend & Stockton LLP

(57) ABSTRACT

Systems and methods for detecting blockages for light detection and ranging ("LiDAR") devices are disclosed. According to one embodiment, a light detection and ranging (LiDAR) blockage detection method includes emitting, by an active channel of a plurality of channels of a LiDAR device, an optical signal toward a configured position on a housing of the LiDAR device. A passive listening channel of the plurality of channels receives a return signal originating from the optical signal. Based on a comparison of data derived from the return signal and data derive from a reference signal, a determination is made as to whether a blockage is present at the configured position on the housing.

18 Claims, 8 Drawing Sheets

BLOCKAGE DETECTION METHODS FOR LiDAR SYSTEMS AND DEVICES BASED ON PASSIVE CHANNEL LISTENING

FIELD OF TECHNOLOGY

The present disclosure relates generally to systems and methods for detecting blockage(s) for light detection and ranging ("LiDAR") devices, and more particularly, to using passive channels of LiDAR devices to detect blockage(s) at LiDAR devices.

BACKGROUND

Light detection and ranging ("LiDAR") systems measure the attributes of their surrounding environments (e.g., shape of a target, contour of a target, distance to a target, etc.) by illuminating the target with light (e.g., laser light) and measuring the reflected light with sensors. Differences in laser return times and/or wavelengths can then be used to make digital, three-dimensional ("3D") representations of a surrounding environment. LiDAR technology may be used in various applications including autonomous vehicles, advanced driver assistance systems, mapping, security, surveying, robotics, geology and soil science, agriculture, and unmanned aerial vehicles, airborne obstacle detection (e.g., obstacle detection systems for aircraft), etc. Depending on the application and associated field of view, multiple channels or laser beams may be used to produce images in a desired resolution. A LiDAR system with greater numbers of channels can generally generate larger numbers of pixels.

In a multi-channel LiDAR device, optical transmitters are paired with optical receivers to form multiple "channels." In operation, each channel's transmitter emits an optical signal (e.g., laser) into the device's environment and detects the portion of the signal that is reflected back to the channel's receiver by the surrounding environment. In this way, each channel provides "point" measurements of the environment, which can be aggregated with the point measurements provided by the other channel(s) to form a "point cloud" of measurements of the environment.

The measurements collected by a LiDAR channel may be used to determine the distance ("range") from the device to the surface in the environment that reflected the channel's transmitted optical signal back to the channel's receiver. In some cases, the range to a surface may be determined based on the time of flight of the channel's signal (e.g., the time elapsed from the transmitter's emission of the optical signal to the receiver's reception of the return signal reflected by the surface). In other cases, the range may be determined based on the wavelength (or frequency) of the return signal (s) reflected by the surface.

In some cases, LiDAR measurements may be used to determine the reflectance of the surface that reflects an optical signal. The reflectance of a surface may be determined based on the intensity on the return signal, which generally depends not only on the reflectance of the surface but also on the range to the surface, the emitted signal's glancing angle with respect to the surface, the power level of the channel's transmitter, the alignment of the channel's transmitter and receiver, and other factors.

In some cases, channels of a LiDAR device may experience blockage(s), where a channel's transmitter and/or receiver may be blocked by foreign material deposited on a window through which the channel views the surrounding environment. Such blockage(s) may degrade performance of the LiDAR device, including reducing a channel's range and interfering with the channel receiver's signal processing operations, which may be calibrated to the power level of the transmitted optical signal. Further, blockage(s) can inhibit the LiDAR device's view of the surrounding environment, as blockages can reflect transmitted optical signals to channel receivers at high intensity levels without allowing the transmitted optical signals to reach the LIDAR device's surrounding environment, effectively preventing the receivers from detecting objects in the surrounding environment.

In some cases, the measurements collected by a LiDAR channel may be used to detect blockages at the LiDAR device. For example, some blockage(s) may be detected transmitting, by a channel transmitter, an optical signal and measuring, by a channel receiver (of the same channel), the baseline intensity of the return signals reflected from the unblocked window through which the channel views the surrounding environment. Based on the measured intensity of the return signals from the unblocked window (baseline "dazzle"), a dazzle threshold can be configured. During operation of the LiDAR device, the dazzle from the window can be measured by a channel and compared to the dazzle threshold, where exceeding the dazzle threshold may result in identifying a blockage at the channel. But, for some LiDAR devices, the baseline dazzle from the window may be significantly smaller than the measured intensity of return signals reflected from surfaces in the surrounding environment, making it difficult to effectively compare the measured dazzle to the dazzle threshold.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

Systems and methods for detecting blockages at a LiDAR device are disclosed. According to one embodiment, a light detection and ranging (LiDAR) blockage detection method includes emitting, by an active channel of a plurality of channels of a LiDAR device, an optical signal toward a configured position on a housing of the LiDAR device. A passive listening channel of the plurality of channels receives a return signal originating from the optical signal. The method further includes, based on a comparison of data derived from the return signal and data derived from a reference signal, determining whether a blockage is present at the configured position on the housing.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the generally description given above and the detailed description of the preferred embodiments given below serve to explain and teach the principles described herein.

Figure 1:
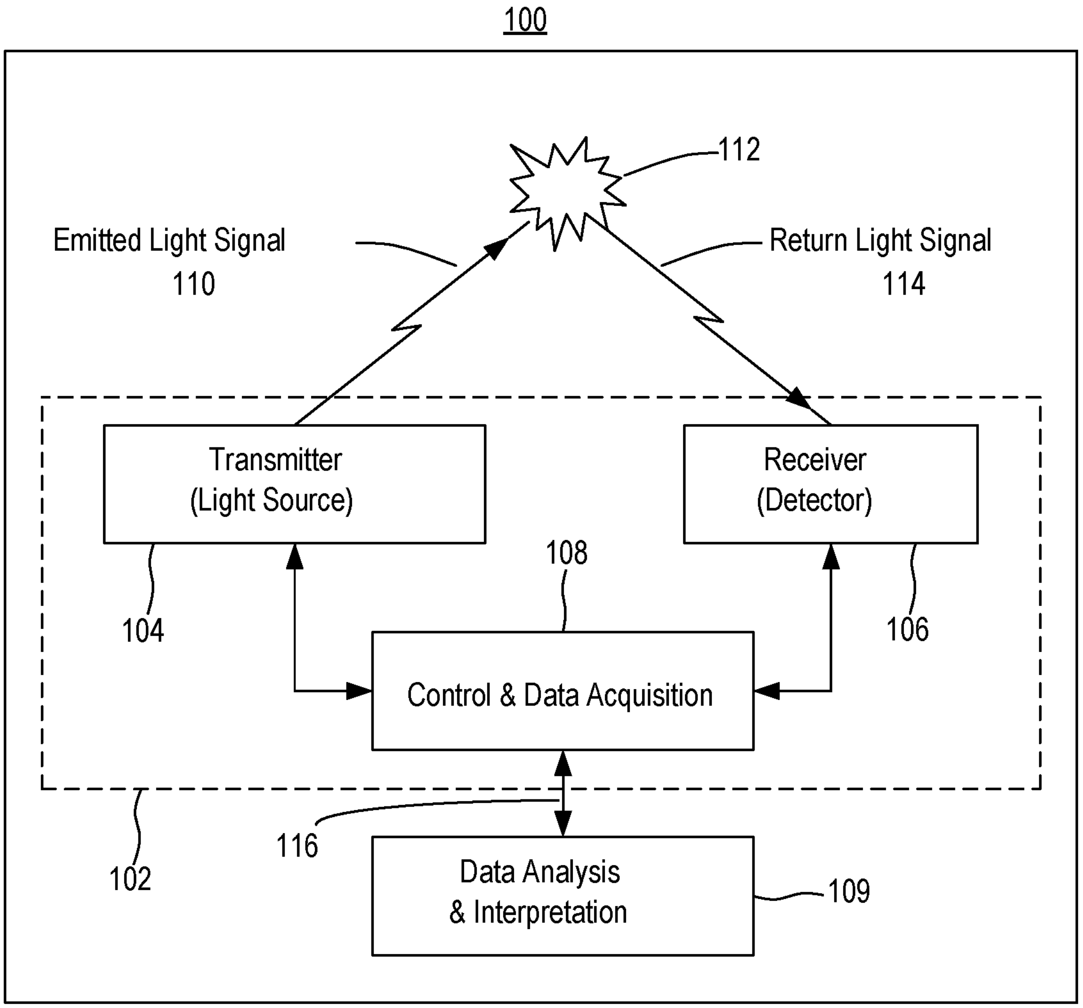
FIG. 1 is an illustration of the operation of an example of a LiDAR system.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

Systems and methods for detecting blockages at a LiDAR device are disclosed. It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details.

Motivation for Some Embodiments

Some existing blockage detection methods for LiDAR devices involve determining a reference (e.g., baseline) dazzle measurement. The reference dazzle measurement may be based on the intensity of the optical signal reflected from a window of the LiDAR device when the window is unblocked (i.e., no blockage (or partial blockage) is present at the window). In some cases, the intensity of the return signals for a channel can be measured over time, resulting in signal intensity peaks (with corresponding widths) that are indicative of reception of the return signal (at the channel receiver) from one or more surfaces in the surrounding environment. The reference dazzle measurement may be determined based on the characteristics of the return signal at (or around) an instant of time indicative of the time elapsed from the emission of the optical signal to the reception of the return signal from the window (e.g., the time of flight of the channel's signal from the channel's emitter to a surface of the window and back to the channel's detector). By determining the reference dazzle measurement, occasions involving blockages at the LiDAR device can be detected based on comparing the measured dazzle measurement with the reference dazzle measurement. The difference (or ratio) of the measured and reference measurements may then be compared to a configured threshold, where exceeding the threshold can indicate a blockage is present at the LiDAR device. However, the efficacy of this method can be affected by the measured intensity of signals reflected from the window (known as "dazzle") being small in comparison to the measured intensity of signals reflected from objects in the surrounding environment. The receiver of the channel emitting the optical signal (e.g., the active channel) may be unable to accurately measure the dazzle with appropriate sensitivity when the intensity of the return signal from the surrounding environment is sufficiently large. As such, detecting differences between the reference dazzle and a measured dazzle is less sensitive than desired, leading to instances where a blockage (or partial blockage) deposited at the LiDAR device is not detected.

Alternatively, one or more additional channels may be added to a multi-channel LiDAR device specifically to detect blockages. For example, a dedicated "blockage-detection channel" may be added to the standard channels of the multi-channel LiDAR device, where the transmitter of the blockage-detection channel can emit an optical signal before or after an operating period for the existing channels. As used herein, "operating period" may refer to a time period in which the LiDAR device activates each of a specified set of channels (e.g., all channels) a single time, such that each of the activated channels emits a ranging signal and monitors for return signals once during the operating period. The receiver of the additional channel may measure the dazzle, which can be compared to a reference dazzle, with a determination of a blockage presence based on a configured threshold as described herein. As another example, a dedicated "blockage-detection channel" may be added to the standard channels of the multi-channel LiDAR device, where the channel transmitter of the blockage-detection channel can emit an optical signal in place of one or more standard channels during an operating period of the LiDAR device. The receiver of the blockage-detection channel can measure the dazzle, which can be compared to a reference dazzle, with a determination of a blockage presence based on a configured threshold as described herein. But, based on introducing additional channels, these solutions suffer from requiring additional hardware and increasing the expense for a multi-channel LiDAR device.

As described herein, when configured in accordance with the existing blockage detection techniques, LiDAR devices may fail to identify blockages, which can cause systems that rely on LiDAR devices for accurate environmental data to fail. For example, in the context of autonomous navigation, the inability to identify blockages can lead to the use of low-resolution and/or inaccurate measurements, which can further cause an autonomous vehicle to navigate inefficiently or even collide with other object in the environment based on the lack of accurate environmental data. Thus, there is a pressing need for improved techniques for detecting blockages at LiDAR devices, such that blockages can be detected and removed by a user or another system.

Some Examples of LiDAR Systems

A light detection and ranging ("LiDAR") system may be used to measure the shape and contour of the environment surrounding the system. LiDAR systems may be applied to numerous applications including autonomous navigation and aerial mapping of surfaces. In general, a LiDAR system emits light that is subsequently reflected by objects within the environment in which the system operates. In some examples, the LiDAR system can be configured to emit light pulses. The time each pulse travels from being emitted to being received (i.e., time-of-flight, "TOF" or "ToF") may be measured to determine the distance between the LiDAR system and the object that reflects the pulse. In other examples, the LiDAR system can be configured to emit continuous wave (CW) light. The wavelength (or frequency) of the received, reflected light may be measured to determine the distance between the LiDAR system and the object that reflects the light. In some examples, LiDAR systems can measure the speed (or velocity) of objects. The science of LiDAR systems is based on the physics of light and optics.

In a LiDAR system, light may be emitted from a rapidly firing laser. Laser light travels through a medium and reflects off points of surfaces in the environment (e.g., surfaces of buildings, tree branches, vehicles, etc.). The reflected light energy returns to a LiDAR detector where it may be recorded and used to map the environment.

FIG. 1 depicts the operation of a LiDAR system 100, according to some embodiments. In the example of FIG. 1, the LiDAR system 100 includes a LiDAR device 102, which may include a transmitter 104 (e.g., laser) that transmits an emitted light signal 110, a receiver 106 (e.g., photodiode) that detects a return light signal 114, and a control & data acquisition module 108. The LiDAR device 102 may be referred to as a LiDAR transceiver or "channel." In operation, the emitted light signal 110 propagates through a medium and reflects off an object 112, whereby a return light signal 114 propagates through the medium and is received by receiver 106.

The control & data acquisition module 108 may control the light emission by the transmitter 104 and may record data derived from the return light signal 114 detected by the receiver 106. In some embodiments, the control & data acquisition module 108 controls the power level at which the transmitter operates when emitting light. For example, the transmitter 104 may be configured to operate at a plurality of different power levels, and the control & data acquisition module 108 may select the power level at which the transmitter 104 operates at any given time. Any suitable technique may be used to control the power level at which the transmitter 104 operates. In some embodiments, the control & data acquisition module 108 determines (e.g., measures) characteristics of the return light signal 114 detected by the receiver 106. For example, the control & data acquisition module 108 may measure the intensity of the return light signal 114 using any suitable technique.

A LiDAR transceiver may include one or more optical lenses and/or mirrors (not shown). The transmitter 104 may emit a laser beam having a plurality of pulses in a particular sequence. Design elements of the receiver 106 may include its horizontal field of view (hereinafter, "FOV") and its vertical FOV. One skilled in the art will recognize that the FOV parameters effectively define the visibility region relating to the specific LiDAR transceiver. More generally, the horizontal and vertical FOVs of a LiDAR system may be defined by a single LiDAR device (e.g., sensor) or may relate to a plurality of configurable sensors (which may be exclusively LiDAR sensors or may have different types of sensors). The FOV may be considered a scanning area for a LiDAR system. A scanning mirror and/or rotating assembly may be utilized to obtain a scanned FOV.

The LiDAR system may also include a data analysis & interpretation module 109, which may receive an output via connection 116 from the control & data acquisition module 108 and perform data analysis functions. The connection 116 may be implemented using a wireless or non-contact communication technique.

Figure 2A:
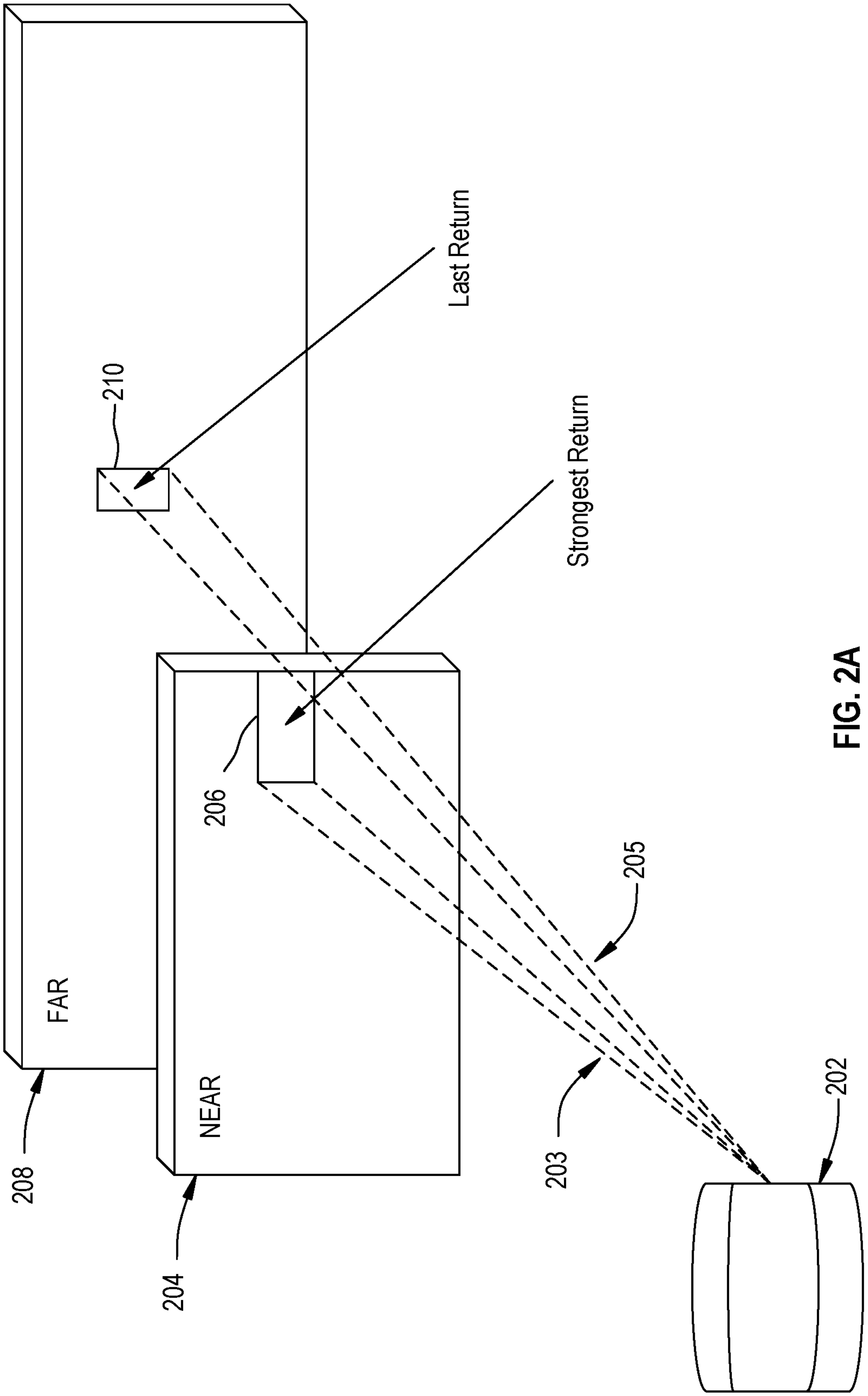
FIG. 2A is another illustration of the operation of an example of a LiDAR system.

FIG. 2A illustrates the operation of a LiDAR system 202, in accordance with some embodiments. In the example of FIG. 2A, two return light signals 203 and 205 are shown. Laser beams generally tend to diverge as they travel through a medium. Due to the laser's beam divergence, a single laser emission may hit multiple objects producing multiple return signals. The LiDAR system 202 may analyze multiple return signals and report one of the return signals (e.g., the strongest return signal, the last return signal, etc.) or more than one (e.g., all) of the return signals. In the example of FIG. 2A, LiDAR system 202 emits a laser in the direction of near wall 204 and far wall 208. As illustrated, the majority of the beam hits the near wall 204 at area 206 resulting in return signal 203, and another portion of the beam hits the far wall 208 at area 210 resulting in return signal 205. Return signal 203 may have a shorter TOF and a stronger received signal strength compared with return signal 205. In both single and multiple return LiDAR systems, it is important that each return signal is accurately associated with the transmitted light signal so that one or more attributes of the object that reflected the light signal (e.g., range, velocity, reflectance, etc.) are correctly calculated.

Some embodiments of a LiDAR system may capture distance data in a two-dimensional ("2D") (e.g., single plane) point cloud manner. These LiDAR systems may be used in industrial applications, or for surveying, mapping, autonomous navigation, and other uses. Some embodiments of these systems rely on the use of a single laser emitter/detector pair combined with a moving mirror to effect scanning across at least one plane. This mirror may reflect the emitted light from the transmitter (e.g., laser diode), and/or may reflect the return light to the receiver (e.g., detector). Use of a movable (e.g., oscillating) mirror in this manner may enable the LiDAR system to achieve 90-180-360 degrees of azimuth (horizontal) view while simplifying both the system design and manufacturability. Many applications require more data than just a single 2D plane. The 2D point cloud may be expanded to form a three-dimensional ("3D") point cloud, where multiple 2D clouds are used, each pointing at a different elevation (vertical) angle. Design elements of the receiver of the LiDAR system 202 may include the horizontal FOV and the vertical FOV.

Figure 2B:
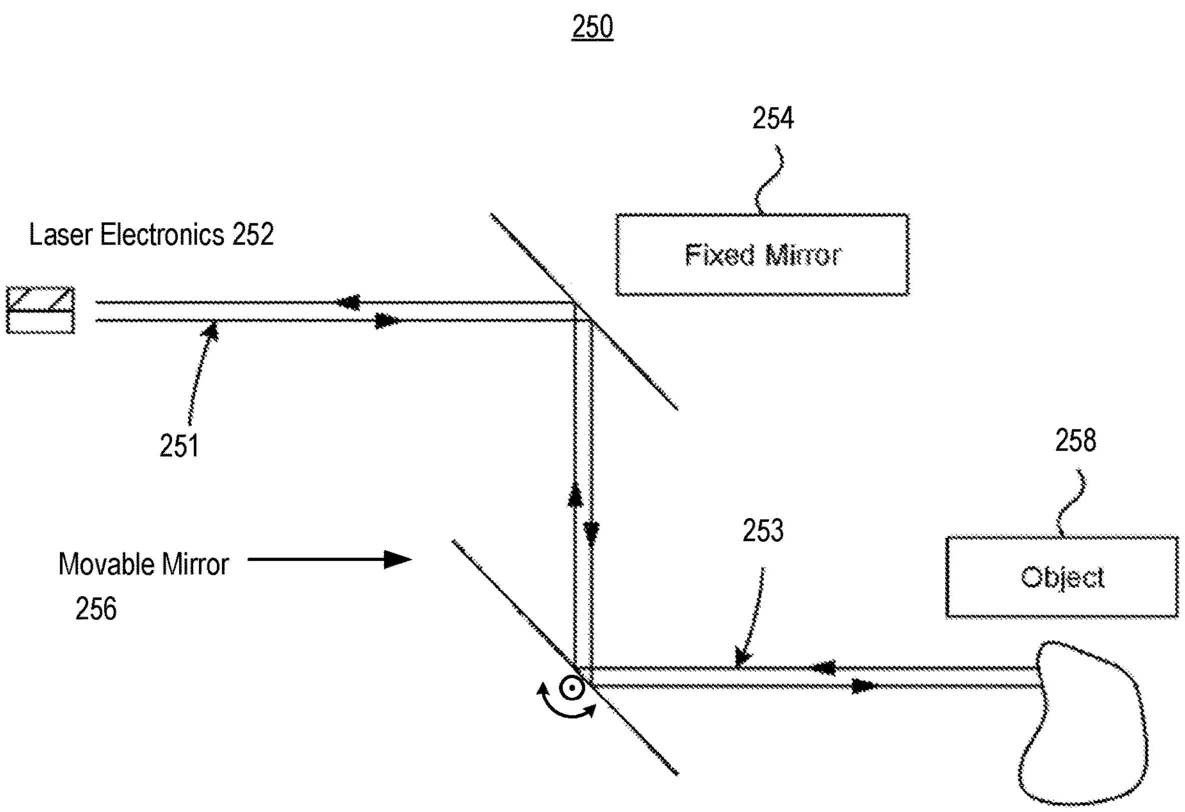
FIG. 2B is an illustration of an example of a LiDAR system with a movable mirror.

FIG. 2B depicts a LiDAR system 250 with a movable (e.g., oscillating) mirror, according to some embodiments. In the example of FIG. 2B, the LiDAR system 250 uses a single laser emitter/detector pair combined with a movable mirror 256 to effectively scan across a plane. Distance measurements obtained by such a system may be effectively two-dimensional (e.g., planar), and the captured distance points may be rendered as a 2D (e.g., single plane) point cloud. In some embodiments, but without limitation, the movable mirror 256 may oscillate at very fast speeds (e.g., thousands of cycles per minute).

The LiDAR system 250 may have laser electronics 252, which may include a single light emitter and light detector. The emitted laser signal 251 may be directed to a fixed mirror 254, which may reflect the emitted laser signal 251 to the movable mirror 256. As movable mirror 256 moves (e.g., "oscillates"), the emitted laser signal 251 may reflect off an object 258 in its propagation path. The reflected signal 253 may be coupled to the detector in laser electronics 252 via the movable mirror 256 and the fixed mirror 254. Design elements of the receiver of LiDAR system 250 include the horizontal FOV and the vertical FOV, which defines a scanning area.

Figure 2C:
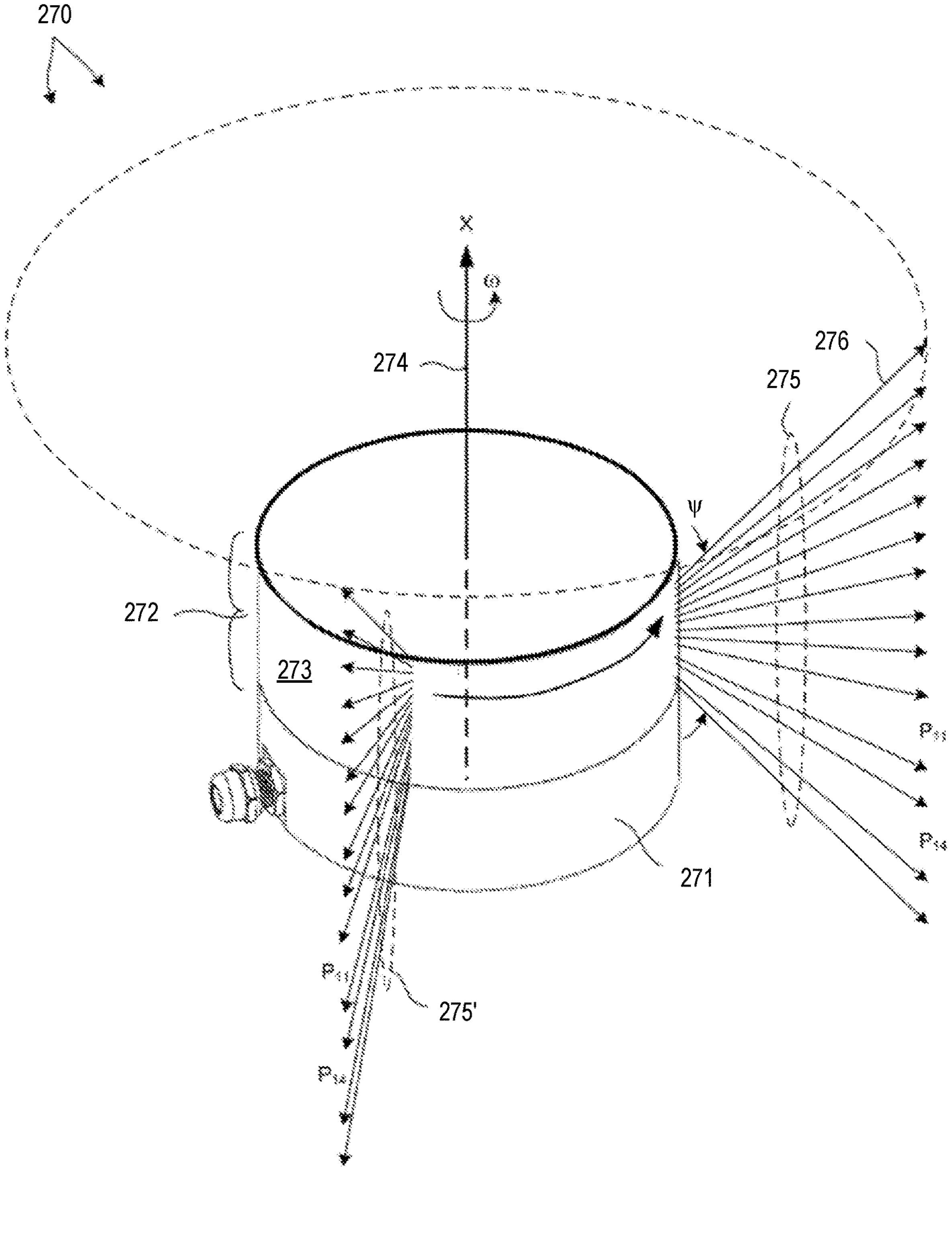
FIG. 2C is an illustration of an example of a three-dimensional ("3D") LiDAR system.

FIG. 2C depicts a 3D LiDAR system 270, according to some embodiments. In the example of FIG. 2C, the 3D LiDAR system 270 includes a lower housing 271 and an upper housing 272. The upper housing 272 includes a cylindrical shell element 273 constructed from a material that is transparent to infrared light (e.g., light having a wavelength within the spectral range of 700 to 1,700 nanometers). In one example, the cylindrical shell element 273 is transparent to light having wavelengths centered at 905 nanometers.

In some embodiments, the 3D LiDAR system 270 includes a LiDAR transceiver 102 operable to emit laser beams 276 through the cylindrical shell element 273 of the upper housing 272. In the example of FIG. 2C, each individual arrow in the sets of arrows 275, 275' directed outward from the 3D LiDAR system 270 represents a laser beam 276 emitted by the 3D LiDAR system. Each beam of light emitted from the system 270 may diverge slightly, such that each beam of emitted light forms a cone of illumination light emitted from system 270. In one example, a beam of light emitted from the system 270 illuminates a spot size of 20 centimeters in diameter at a distance of 100 meters from the system 270.

In some embodiments, the transceiver 102 emits each laser beam 276 transmitted by the 3D LiDAR system 270. The direction of each emitted beam may be determined by the angular orientation $\omega$ of the transceiver's transmitter 104 with respect to the system's central axis 274 and by the angular orientation $\psi$ of the transmitter's movable mirror 256 with respect to the mirror's axis of oscillation (or rotation). For example, the direction of an emitted beam in a horizontal dimension may be determined by the transmitter's angular orientation $\omega$, and the direction of the emitted beam in a vertical dimension may be determined by the angular orientation $\psi$ of the transmitter's movable mirror. Alternatively, the direction of an emitted beam in a vertical dimension may be determined by the transmitter's angular orientation $\omega$, and the direction of the emitted beam in a horizontal dimension may be determined by the angular orientation $\psi$ of the transmitter's movable mirror. (For purposes of illustration, the beams of light 275 are illustrated in one angular orientation relative to a non-rotating coordinate frame of the 3D LiDAR system 270 and the beams of light 275' are illustrated in another angular orientation relative to the non-rotating coordinate frame.)

The 3D LiDAR system 270 may scan a particular point in its field of view by adjusting the orientation $\omega$ of the transmitter and the orientation $\psi$ of the transmitter's movable mirror to the desired scan point ($\omega$, $\psi$) and emitting a laser beam from the transmitter 104. Likewise, the 3D LiDAR system 270 may systematically scan its field of view by adjusting the orientation $\omega$ of the transmitter and the orientation $\psi$ of the transmitter's movable mirror to a set of scan points ($\omega_i$, $\psi_j$) and emitting a laser beam from the transmitter 104 at each of the scan points.

Assuming that the optical component(s) (e.g., movable mirror 256) of a LiDAR transceiver remain stationary during the time period after the transmitter 104 emits a laser beam 110 (e.g., a pulsed laser beam or "pulse" or a CW laser beam) and before the receiver 106 receives the corresponding return beam 114, the return beam generally forms a spot centered at (or near) a stationary location L0 on the detector. This time period is referred to herein as the "ranging period" of the scan point associated with the transmitted beam 110 and the return beam 114.

As discussed above, some LiDAR systems may use a continuous wave (CW) laser to detect the range and/or velocity of targets, rather than pulsed TOF techniques. Such systems include frequency modulated continuous wave (FMCW) coherent LiDAR systems. For example, any of the LiDAR systems 100, 202, 250, and 270 described above can be configured to operate as an FMCW coherent LiDAR system.

Passive Channel Operation

Conventional techniques for detecting blockages at LiDAR devices can be ineffective, which can cause systems that rely on LiDAR devices for accurate environmental data to fail. Improved techniques for detecting blockages at LiDAR devices can include application of methods and systems for "passive channel listening."

During an operating period of a LiDAR device, each channel of the LiDAR device may be either an "active channel" (a channel having an emitter configured to activate, such that the channel emits an optical signal during the operating period) or a "passive channel" (a channel having an emitter configured to remain inactive during the operating period, such that the channel does not emit an optical signal during the operating period). During an operating period in which a channel is passive, the passive channel's detector is generally not activated, such that the passive channel does not "listen" (monitor) for return signals during the operating period. However, the inventors have recognized and appreciated that configuring one or more passive channels to listen for return signals of one or more active channels during an operating period can enhance a LiDAR device's blockage-detection capabilities, because the return signal produced when an active channel's emitted light is reflected by a blockage may be detectable by a passive channel and distinguishable from return signals reflected by objects in the environment (rather than being reflected by a blockage), as described in further detail herein. The use of passive channels to listen for return signals during an operating period may be referred to herein as "passive channel listening."

A channel that is configured as a passive channel during one or more operating periods may be configured as an active channel during one or more other operating periods. In some cases, only a single passive channel is configured to perform passive channel listening during an operating period (or during a portion of an operating period, such that two passive channels do not perform passive channel listening simultaneously.

To detect blockages at the LiDAR device, a passive channel may be configured to monitor for return signal(s) reflected from a window through which the channel views the surrounding environment during operation (e.g., during an operating period) of the LiDAR device. In this context, "operating period" may refer to a time period in which the LiDAR device activates each of a specified set of channels a single time, such that each of the active channels emits a ranging signal once during the operating period.

As used herein "listening period" may refer to a time period during which one or more receivers of a LiDAR device monitor for and detect return signals. The listening period for an active channel may begin immediately or a short period (e.g., 1-5 ns) after the active channel emits an optical signal, and the duration of the listening period for an active channel may be determined based on the maximum detection range of the LiDAR device, such that the listening period can accommodate return signals returning from objects located at a maximum range from the LiDAR device. As an example, the listening period of an active channel for a LiDAR device having a range of 100-500 m may be between approximately 700 ns and approximately 3.5 μs (e.g., a listening period of approximately 1 μs for a range of approximately 150 m).

When a passive channel performs passive channel listening, the passive channel's listening period may begin immediately after an active channel emits an optical signal, and the duration of the listening period for the passive channel may be the same as the duration of the listening period for the active channel. Alternatively, the duration of the listening period for the passive channel may be shorter than the duration of the listening period for the active channel. For example, the duration of the listening period for the passive channel may be long enough to cover the time of flight for return signals reflecting from a blockage of the LiDAR device's window (e.g., 5-10 ns), but not long enough to cover the time of flight for returns signals returning from objects located at the maximum range of the LiDAR device.

In some embodiments, passive channel listening may be used in connection with operating modes in which the LiDAR device activates at most one channel's emitter at a time (e.g., operating modes in which simultaneous activation of multiple channels does not occur). For example, in such operating modes, every channel of a LiDAR device may be configured to emit an optical signal during an operating period to map the surrounding environment, but only one channel may emit an optical signal at a given time instant within the operating period.

In some embodiments, channels of the LiDAR device may be configured to cycle (e.g., periodically or intermittently cycle) between an active state and a passive state during a sequence of operating periods. During an operating period in which a channel is in the "active state," the channel may emit an optical signal and monitor for return signals. During an operating period in which a channel is in the "passive state," the channel may (1) neither emit an optical signal nor monitor for return signals (a "passive non-listening state" or "inactive state") or (2) monitor for return signals without emitting an optical signal (a "passive listening state").

For example, for a LiDAR device having 4 channels ($1^{st}$, $2^{nd}$, $3^{rd}$, and $4^{th}$ channels), a $1^{st}$ channel may be active during a first operating period, while $2^{nd}$, $3^{rd}$, and $4^{th}$, channels are passive; during a second operating period, a $2^{nd}$ channel may be active, while $1^{st}$, $3^{rd}$, and $4^{th}$ channels are passive, and so on. In the active state, a channel may emit optical signal(s) for a subset of the operating period (e.g., a first portion of the operating period, which may be referred to as a "firing period"). The subset of the operating period for which a channel is configured to emit optical signal(s) may be equal for all channels or different for different subsets of the channels of the LiDAR device. For example, for a LiDAR device having 4 channels ($1^{st}$, $2^{nd}$, $3^{rd}$, and $4^{th}$ channels), $1^{st}$ and $3^{rd}$ channels may be configured to emit optical signals during firing periods of a first duration at the beginning of a first operating period and a second operating period, respectively, while $2^{nd}$ and $4^{th}$ channels may be configured to emit optical signals during firing periods of a second duration at the beginning of a third operating period and a fourth operating period, respectively.

Similarly, during an operating period when a channel is in the active state, the channel may monitor for return signal(s) for a subset of the operating period (e.g., during a second portion of the operating period, which may be referred to as a "listening period"). The subset of the operating period for which a channel is configured to monitor for return signal(s) may be equal for all channels or different for different subsets of the channels of the LiDAR device. For example, for a LiDAR device having 4 channels ($1^{st}$, $2^{nd}$, $3^{rd}$, and $4^{th}$ channels), $1^{st}$ and $3^{rd}$ channels may be configured to monitor for return signal(s) during a listening period of a first duration during a first operating period and a second operating period, respectively, while $2^{nd}$ and $4^{th}$ channels may be configured to monitor for return signal(s) during a listening period of a second duration during a third operating period and a fourth operating period, respectively.

A feature of passive channel listening may be the use of one or more passive listening channels (e.g., a single listening passive channel) to monitor for return signals (e.g., dazzle) originating from the active channel of the LiDAR device during an operating period. Based on the configuration of the passive listening channel to monitor for return signals from the window, the passive listening channel may be able to measure dazzle from the window with increased sensitivity and/or accuracy. In some cases, based on the ability to measure dazzle from the window with increased sensitivity and accuracy, reference dazzle and/or measured dazzle may be more accurately determined by the receiver included in the passive listening channel. The LiDAR device may compare the measured dazzle to the reference dazzle and use a threshold (e.g., a ratio or a difference between measured dazzle and reference dazzle) to distinguish between scenarios in which a blockage is present (e.g., the observed ratio or difference between the measured and reference dazzle exceeds the threshold) and scenarios in which a blockage is not present (e.g., the observed ratio or difference between the measured and reference dazzle does not exceed the threshold). Based on the ability to more accurately determine reference dazzle (as described herein) and/or measured dazzle, the configured threshold may be more finely tuned, such that blockages may be more accurately detected.

In some embodiments, passive channel listening may occur during one or more (e.g., all) operating periods of a LiDAR device. Additionally or alternatively, in some embodiments, passive channel listening may occur outside (e.g., before or after) operating periods. An active channel including a transmitter and a receiver may have both the transmitter and receiver configured as active during the operating period. For example, for an active channel, the transmitter may emit an optical signal and the receiver may monitor for return signals from surfaces in the surrounding environment. A passive listening channel including a transmitter and a receiver may have a transmitter configured as inactive and a receiver configured as active during the operating period, wherein the passive listening channel's receiver is configured to monitor for return signals during a same listening period as the active channel's receiver. For example, for a passive listening channel, the transmitter may be inactive and the receiver may be active, such that the transmitter does not emit an optical signal and the receiver monitors for return signals originating from an active channel of the LiDAR device. In this way, the passive listening channel may monitor for return signal crosstalk from the active channel.

In some embodiments, passive listening channels can monitor for return signals originating from active channels.

A passive listening channel may be configured to monitor for return signals originating from an active channel that is nearby, wherein a first channel is considered nearby a second channel if the channels are adjacent or proximal to each other. In some cases, channels that are nearby may be considered neighboring channels. For example, for a LiDAR device including a linear array of channels ordered as channel 1-channel 4, channel 1 may be considered a neighboring channel of channel 2 when channel 1 is configured as an active channel and channel 2 is configured as a passive listening channel. In some embodiments, a passive listening channel may be configured to monitor for return signals originating from a nearby active channel based on a degree of separation between the passive listening channel and the active channel. A degree of separation may correspond to the number of channels that exist between two channels. For example, for a pair of channels that are adjacent to each other, the degree of separation may be 1; for a pair of channels are that are proximal to each other, with one channel in between the pair of channels, the degree of separation may be 2. A first channel may be referred to as a neighbor of a second channel based on the degree of separation between the first channel and second channel. For a degree of separation of 1, a pair of channels may be referred to as $1^{st}$ neighbors. For a degree of separation of 2, a pair of channels may be referred to as $2^{nd}$ neighbors. Accordingly, a channel may be considered a $K^{th}$ neighbor of another channel based on K degrees of separation between the two channels. A channel Cx of a LiDAR device that is a $K^{th}$ neighbor of a channel Cy of the LiDAR device may be configured as a passive listening channel during an operating period in which channel Cy is active, where K is any suitable positive integer. In some embodiments, a $1^{st}$ neighbor or $2^{nd}$ neighbor of an active channel may be configured as a passive listening channel to detect blockages. Any configuration of a $K^{th}$ neighbor of an active channel may be configured as a passive listening channel as described herein.

Figure 3:
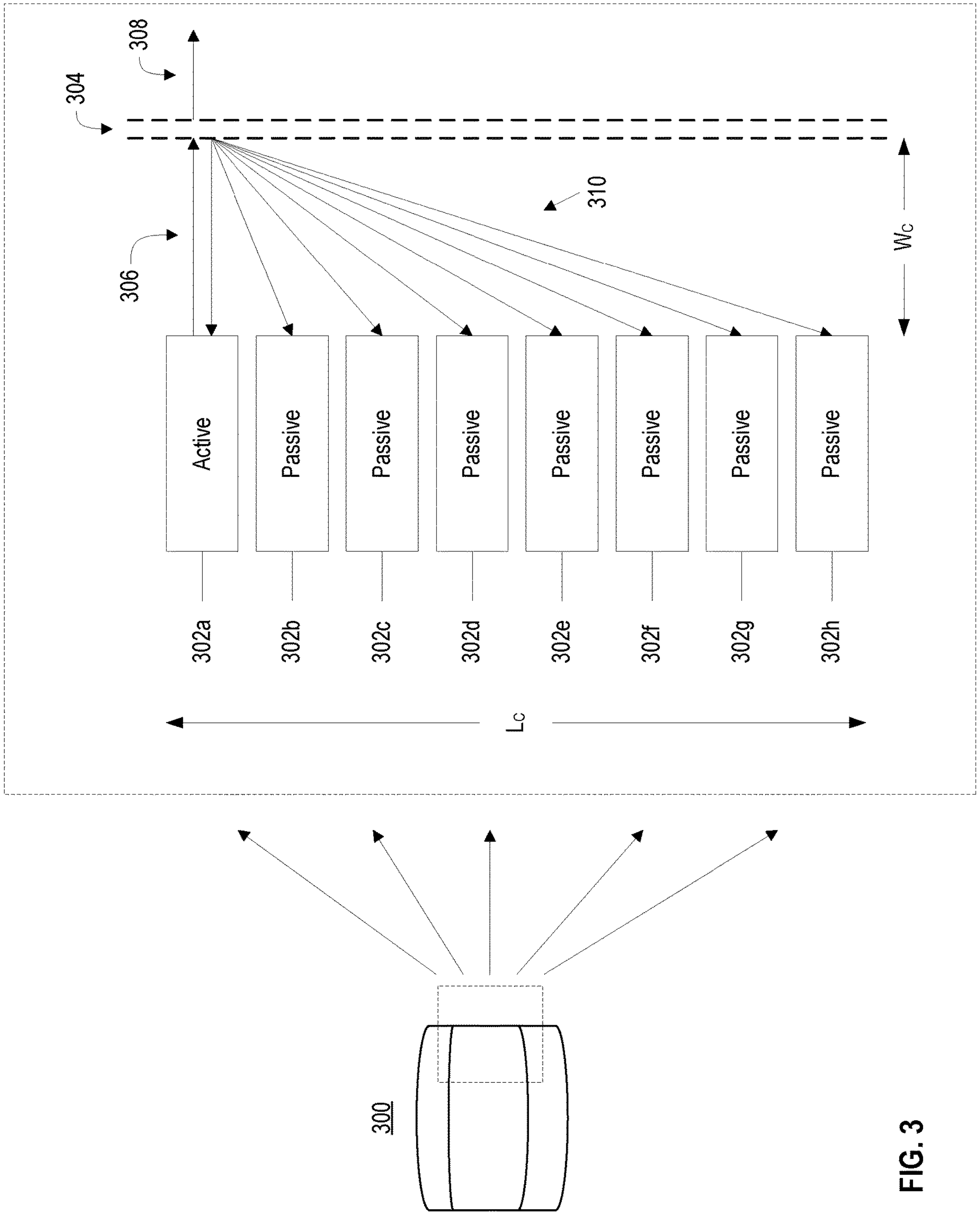
FIG. 3 is an illustration of an example of a LiDAR device with multiple channels.

In some embodiments, a LiDAR device (e.g., a multi-channel LiDAR device) may include a plurality of channels, which may produce channel crosstalk when an optical signal emitted from a first channel is detected by a receiver of a channel different from the first channel. Channel crosstalk may result from return signals reflecting from surfaces in the environment surrounding the LiDAR device, as well as from the window through which the channels view the environment. Referring to FIG. 3, a LiDAR device 300 may include a plurality of channels 302. The channels 302 may be arranged linearly along the length $L_C$ of the LiDAR device 300. The channels 302 may be arranged linearly along any suitable length $L_C$ with any suitable number of channels 302. In some cases, the channels 302 may be arranged in any other suitable arrangement (e.g., a non-linear arrangement). As an example, a particular transmitter-receiver optical sub-assembly (TROSA) may include a plurality (e.g., eight) channels 302 stacked vertically, where optical paths of each adjacent channel 302 are positioned N degrees apart (e.g., N=2), such that the channels 302 can scan a vertical FOV of at least approximately 16 degree. The LiDAR device 300 may include a window 304 through which the channels 302 view the surrounding environment 306. The channels 302 may be arranged a width $W_C$ away from the window 304. In some cases, the width $W_C$ may be uniform for each channel of the channels 302. In other cases, the width $W_C$ may be variable for each channel of the channels 302. Each of the channels 302 may include a transmitter and a receiver as described herein. The window 304 may reflect at least a portion of an emitted signal from a transmitter of a channel (e.g., the channel 302*a*) to one or more receivers of the channels 302.

At least one of the channels 302 may be configured as an active channel during an operating period of the LiDAR device 300, where the active channel may emit an optical signal and monitor for corresponding return signal(s) during the operating period. For example, channel 302*a* may be configured as an active channel during an operating period. One or more channels of the channels 302 may be configured as passive listening channels during an operating period, where the passive listening channels monitor for return signal(s) originating from optical signals emitted by an active channel. For example, channels 302*b*-302*h* may be configured as passive channels to monitor for the return signals originating from channel 302*a*. For the LiDAR device 300 as illustrated in FIG. 3, channel 302*b* may be considered a $1^{st}$ neighbor of channel 302*a* and channel 302*c* may be considered a $2^{nd}$ neighbor of channel 302*a* based on the respective degrees of separation between the channels. During an exemplary operating period, a single channel 302 may be configured as an active channel and a signal channel 302 may be configured as a passive listening channel, such that a pair of channels (e.g., an active channel and passive listening channel) are used to detect blockages at the LiDAR device.

Based on being configured as the active channel during an operating period, the channel 302*a* may emit an optical signal 306 (or more than one optical signal 306) to map the surrounding environment. The optical signal 306 may propagate through the LiDAR device to reach the window 304. A portion of the optical signal 306 may propagate through the window 304 as an optical signal 308. The optical signal 308 may continue to propagate through the surrounding environment and may strike one or more surfaces as described herein. Another portion of the optical signal 306 may be reflected within the LiDAR device by the window 304. A portion of the optical signal 306 may be reflected as one or more return signals 310. The one or more return signals 310 may be detected by the receivers of the active channel (e.g., the channel 302*a*) and a passive listening channel of the one or more configurable passive channels (e.g., the channels 302*b*-302*h*). One or more measurements derivable from the return signals 310 detected by the passive listening channel (e.g., the intensity of the return signal 310, the reflectance of the surface that reflected the return signal 310, etc.) may indicate or represent the dazzle from the window 304. The intensity of the return signals 310 may be measured by the receiver of the passive listening channel as a function of time.

In some embodiments, the dazzle from the window 304 (corresponding to the intensity of the return signals 310) may be used to detect blockages at the LiDAR device 300. The dazzle from the window 304 may be determined in a reference (e.g., baseline) environment, where the window 304 is free of blockages. The dazzle measurements determined in the reference environment may be compared to dazzle measurements determined during operation of the LiDAR device 300, where the comparison can be used to detect a blockage at the window 304. The dazzle measured by a passive listening channel may be processed as a function of the width $W_C$ and a wavelength of optical signal (e.g., the optical signal 306) emitted by the active channel, such that the timing (e.g., the TOF) associated with the return signals 310 originating from the optical signal 306 may be determined.

Reference Dazzle Calibration

To enable blockage detection for a multi-channel LiDAR device (e.g., the LiDAR device 300), reference (e.g., baseline) dazzle measurements may be determined. As described herein, a reference measurement may be a measurement of the intensity of the return signal from the window (i.e. the dazzle) when the window is unblocked (e.g., free of foreign materials deposited on the window). As a part of a calibration method for passive channel listening, reference measurements may be measured by a passive listening channel, which can detect a return signal originating from an active channel of the LiDAR device. Reference measurements may be collected for each channel of the LiDAR device in one or more operating modes of the channel, where a channel's "operating mode" may determine a nominal power level of the channel's transmitter or of the optical signal emitted by the transmitter. In some cases, reference measurements may be collected with transmitters of each channel operating at their maximum power level. In other cases, reference measurements may be collected with transmitters of each channel operating at a range of power levels. For example, reference measurements may be collected with transmitters of channels operating at each configurable power level of the transmitters.

In some embodiments, as a part of a calibration method for passive channel listening, reference measurements may be collected while a single channel of the LiDAR device operates as the active channel. One or more sets of reference measurements may be collected for one or more configurations for an active channel and a passive listening channel of the LiDAR device. Channels that are not configured as the active channel or the passive listening channel may be configured as inactive. A passive listening channel in the calibration method may be configured to monitor for a return signal during the listening period of the active channel (e.g., during a portion of the listening period of the active channel, or throughout the entire listening period of the active channel). As an example, a passive listening channel may monitor for a return signal beginning at the start of the listening period of the active channel and ending at the end of the listening period. The period during which a passive listening channel monitors for return signals may be referred to as the passive listening channel's listening period.

To determine each reference measurement, as a part of a calibration method, an active channel may emit an optical signal. Based on the active channel emitting an optical signal at a configured power level, a passive listening channel may be configured to monitor for a return signal from the window during a listening period beginning from the time of emission of the optical signal from the transmitter of the active channel. The receiver of the passive listening channel may measure the intensity of return signals, including the return signal reflected from the surface of the window. Based on measuring the intensity of the return signal over the duration of the listening period at the passive listening channel, the LiDAR device may store each reference measurement. The resulting reference measurement may be determined as a function of measured intensity of the return signal over time (e.g., the duration of the listening period). Each reference measurement may include an indication of the active channel that emitted the optical signal(s) and the passive listening channel that measured the return signal(s) originating from the optical signal(s). In some cases, each reference measurement can include the configured power level(s) of the transmitter corresponding to the active channel. For example, for a LiDAR device having 4 channels arranged in a linear array ordered as channel 1-channel 4, the reference measurement may include an indication that channel 1 was configured as the active channel at a first power level and an indication that channel 3 was configured as the passive listening channel that determined the reference measurement. The calibration method may be executed for each channel of the LiDAR device, where each channel is configured as the active channel and with each of the other channels configured as a passive listening channel. The calibration method may be used to identify which pair of an active channel and passive listening channel are the most sensitive (or sufficiently sensitive) to detecting blockages at the LiDAR device. In some cases, the calibration method may occur sequentially for each channel of the LiDAR device, such that a particular channel is configured as an active channel and each other channel is individually configured as a passive listening channel (e.g., with all channels other than the active channel and the passive listening channel configured as inactive). Any suitable combination of channels configured as active channels and as passive channels may be used such that the operating conditions (e.g., channel configuration, configuration of power levels, etc.) during reference calibration and during LiDAR device operation are substantially the same.

Executing the calibration method for each channel of the LiDAR device as described herein may yield a plurality of reference measurements. The plurality of reference measurements may correspond to each channel being configured as a passive listening channel to measure the return signal originating from an active channel of the LiDAR device. A reference measurement determined according to the calibration method may be referred to as "reference dazzle," indicating the measured intensity of the return signal from the window received at a passive channel of the LiDAR device.

In some embodiments, each reference dazzle collected from the calibration method as described herein may be processed. Each reference dazzle may be processed for comparison with a corresponding measured dazzle determined during operation of the LiDAR device. The reference dazzle may be processed at the LiDAR device by a data analysis and interpretation module (e.g., the data analysis & interpretation module 109). In some cases, the reference dazzle can be processed to determine the magnitude of the intensity peak associated with the return signal from the window. The intensity peak may correspond to a measurement of the intensity of the received return signal(s) from the LiDAR device's window over time. The magnitude of the intensity peak may be valuable for comparing a reference dazzle and measured dazzle. Accordingly, the intensity of a return signal may be assessed based on the magnitude of the measured intensity peak, which can be applied to detect blockages at a LiDAR device.

In some embodiments, the reference dazzle can be processed to determine the width of the intensity peak associated with the return signal from the window, wherein the width is associated with the duration of time over which the peak was measured and/or otherwise detected by a receiver of the passive channel. The width may be determined based on an intensity threshold, where the intensity threshold may be equivalent for processing each reference dazzle. The width may be determined as a function of the duration of time for which the measured intensity is greater than or equal to the intensity threshold. For example, for a reference dazzle, the intensity peak may be greater than an intensity threshold for a period of Y seconds, yielding an intensity peak width of Y. The width of the intensity peak may be valuable for comparing a reference dazzle and measured dazzle, as the width of the intensity peak may be positively correlated with the magnitude (e.g., height) of the intensity peak. Accordingly, the intensity of a return signal may be assessed based on the width of the measured intensity peak, which can be applied to detect blockages at a LiDAR device.

In some embodiments, the reference dazzle can be processed to determine area under the intensity peak associated with the return signal from the window, wherein the area is based on a magnitude and timing over which the intensity peak was measured and/or otherwise detected by a receiver of the passive channel. The area under the intensity peak may be determined by integrating the intensity peak for the times indicating the start and end of the intensity peak. In some cases, the intensity peak may be approximated by a function (e.g., a hyperbolic function) for integration purposes. In some cases, the times used for integration may be determined based on an intensity threshold, where the intensity threshold may be equivalent for processing each reference dazzle. The times used for integration may be a first time for which the measured intensity initially exceeds or is equal to the intensity threshold and a second time for which the measured intensity initially falls below or is equal to the intensity threshold. In other cases, the times used for integration may be configured as a fixed duration of time, where the times are determined based on centering the fixed duration of time at the intensity peak and selecting the corresponding time values at the start and end of the fixed duration. The area under the intensity peak may be valuable for comparing a reference dazzle and measured dazzle, as the area under the intensity peak can combine the features as described herein for the magnitude and width of the intensity peak. Accordingly, the intensity of a return signal may be assessed based on the area under of the measured intensity peak, which can be applied to detect blockages at a LiDAR device.

Measured Dazzle During Device Operation

During operation of a LiDAR device (e.g., to map surroundings or provide environmental range data), blockages of the housing of the LiDAR device may be detected. Channels of the LiDAR device may detect blockages at the window through which the channels view the surrounding environment. The LiDAR device may detect blockages based on reference dazzle values as described herein, which may be compared to measured dazzle values determined from the one or more channels configured for passive channel listening. Based on the comparison, the LiDAR device may determine a difference or ratio of the reference dazzle in view of the measured dazzle. The LiDAR device may compare the determined difference or ratio with a threshold for the difference or ratio. If the determined difference or ratio exceeds the threshold, the LiDAR device may determine a blockage to be present at the window. Based on determining a blockage is present, the LiDAR device may generate an indication that the LiDAR device is experiencing a blockage.

In some embodiments, during operation of the LiDAR device, measurements collected by the channels may be used to determine the distance from the LiDAR device to the surfaces in the environment, as well as the reflectance of each of the surfaces (e.g., based on return signal intensity). The determined distances and reflectance of the surfaces can be used to map the environment surrounding the LiDAR device. Accordingly, in some embodiments, a single channel at a given time instant may be configured as the active channel to determine range (and, optionally, reflectance) information. An active channel of the LiDAR device may have a transmitter configured to emit an optical signal and a receiver configured to measure for return signal(s) reflecting from surfaces in the surrounding environment. The active channel may measure for return signals for a duration (i.e. listening period) beginning at the time the transmitter emits an optical signal, lasting until (e.g., at least until) a time corresponding to receiving a return signal returning from the maximum intended range of the active channel.

A channel of the one or more channels that is not initially configured as the active channel may be configured as the passive listening channel. Channels that are not configured as either the active channel or the passive listening channel may be configured as inactive. As described herein, a passive listening channel may be configured to monitor and/or measure for a return signals reflecting from the LiDAR device's surrounding environment (including the LiDAR device's window) for a duration corresponding to the listening period as described herein.

To begin operation, an active channel may emit an optical signal at a configured power level. The active channel may monitor for return signal(s) reflecting from surfaces in the surrounding environment by measuring return signal intensity at the receiver for a duration of time corresponding to the listening period as described herein. Based on the active channel emitting an optical signal, the passive listening channel may be configured to monitor for return signals (e.g., including the return signal(s) from the window) for a duration beginning from the time of emission of the optical signal from the transmitter of the active channel. The receiver of the passive listening channel may measure dazzle as an intensity of a return signal reflected from the surface of the window over time. In some cases, the LiDAR device may identify dazzle in the return signal data based on the ToF for an emitted optical signal to travel to the LiDAR device's window and reflect from the window to a passive listening channel's receiver as a return signal. Based on measuring the dazzle at the passive channel, the LiDAR device may use and/or store each measured dazzle value for further processing to determine whether a blockage is present. The resulting measured dazzle values may be determined to be a function of measured intensity of the return signal over time (e.g., the duration). Each measured dazzle value may include an indication of the active channel that emitted optical signal(s), the passive listening channel that determined the measured dazzle value, and the configured power level of the active channel. By including the configured power level of the active channel with the measured dazzle value, the measured dazzle value can be compared to a reference dazzle value with the same configured power level as described herein. LiDAR device operation as described herein may yield a plurality of measured dazzle values resulting from the initially configured active channel. The plurality of measured dazzle values may correspond to initially configured passive listening channel.

In some embodiments, each measured dazzle collected by the passive listening channel as described herein may be processed. Each measured dazzle may be processed for comparison with a corresponding reference dazzle determined according to the calibration method as described herein. Each measured dazzle may be processed at the LiDAR device by a data analysis and interpretation module (e.g., the data analysis & interpretation module 109). In some cases, each measured dazzle can be processed to determine the magnitude of the signal intensity peak associated with the return signal from the window, wherein the magnitude is associated with the intensity of the return signal from the window that was detected by a receiver of the passive listening channel. As described herein, a measured dazzle may be identified in return signal data measured by a passive listening channel's receiver based on the distance between the passive channel and the LiDAR device's window and the ToF of the return signal.

In some embodiments, each measured dazzle can be processed to determine the width of the intensity peak associated with the return signal from the window, wherein the width is associated with the duration of time over which the peak was measured and/or otherwise detected by a receiver of the passive channel. The width may be determined based on an intensity threshold as described herein.

In some embodiments, each measured dazzle can be processed to determine area under the intensity peak associated with the return signal from the window as described herein. The area under the intensity peak may be determined by integrating the intensity peak for the times indicating the start and end of the intensity peak. In some cases, the intensity peak may be approximated by a function (e.g., a hyperbolic function) for integration purposes. In some cases, the times used for integration may be determined based on an intensity threshold, where the intensity threshold may be equivalent for processing each reference dazzle. The times used for integration may be a first time for which the measured intensity initially exceeds or is equal to the intensity threshold and a second time for which the measured intensity initially falls below or is equal to the intensity threshold. In other cases, the times used for integration may be configured as a fixed duration of time, where the times are determined based on centering the fixed duration of time at the intensity peak and selecting the corresponding time values at the start and end of the fixed duration.

Dazzle Comparison for Blockage Detection

In some embodiments, based on processing the measured dazzle values to determine a magnitude, width, or area as described herein, each measured dazzle can be compared to corresponding reference dazzle values. The comparison may determine whether there is an identifiable blockage at the LiDAR device. For each measured dazzle value, a corresponding reference value may be obtained and/or otherwise received. A corresponding reference value may have been determined by a same configuration of the LiDAR device, such that the same passive listening channel determined the measured dazzle value, corresponding to the same active channel emitting optical signals at the same configured power level. In some cases, based on obtaining corresponding reference dazzle values, a difference (i.e. delta) may be determined between each measured dazzle value and the corresponding reference dazzle value. In other cases, based on obtaining the corresponding reference dazzle values, a ratio may be determined (e.g., computed) for each measured dazzle value and the corresponding reference value. The determined difference or ratio for each measured dazzle value and reference dazzle value may be compared to a threshold difference or a threshold ratio. The threshold difference or ratio may be configured based on the desired tolerance for identifying blockages at the LiDAR device. For applications requiring a low degree of tolerance, the threshold difference or ratio may be configured to be small. If the threshold difference or ratio is configured to be too small, the LiDAR device may detect a blockage when no blockage is present or when a blockage (e.g., a partial blockage) is present that has a trivial impact on LiDAR device performance (e.g., range or reflectance detection). For applications that do not require a low degree of tolerance, the threshold difference or ratio may be configured to be large. If a threshold difference or ratio is configured to be too large, the LiDAR device may fail to detect blockages that have a material impact on the device's performance, such as range or reflectance detection capabilities. Accordingly, the threshold difference or threshold ratio may be selected based on the application of the LiDAR device. In some cases, the threshold difference or the threshold ratio may be experimentally determined during the calibration process to determine the sensitivity of reference dazzle measurements compared to dazzle measurements when a blockage is present on the LiDAR device's window. Based on the changes in dazzle measurements when a blockage is and is not present on the LiDAR device's window, the threshold difference or threshold ratio may be configured.

In some embodiments, based on comparing the determined difference or ratio or to the threshold difference or ratio, the LiDAR device may determine whether a blockage is present at the LiDAR device. If the determined difference or ratio is less than the threshold difference or ratio, the LiDAR device may be configured to continue operating. If the determined difference or ratio is greater than the threshold difference or ratio, the LiDAR device may be configured to detect a blockage. Based on detecting a blockage, the LiDAR device may generate a notification for a user of the LiDAR device or a system including the LiDAR device that includes an indication that a blockage is present at the LiDAR device. In some cases, the indication may include a location of the blockage present at the LiDAR device, as the location of the blockage may be determined based on the position and/or optical path of the passive listening channel and/or the active channel that were used to detect the blockage. Some examples of features of a blockage identified by the LiDAR device may include location, reflectivity, and type of blockage. Based on detecting a blockage, the LiDAR device may generate an alert (e.g., a "flag"). The LiDAR device may output the alert to a user and/or to an external computing system (e.g., system 500 or data analysis & interpretation module 109) coupled to the LiDAR device. The alert may include an indication that a blockage is present at the LiDAR device and/or that a user should remove the blockage. In some embodiments, based on detecting a blockage, the LiDAR device may disable the active channel and/or passive listening channel such that the LiDAR device does not detect environmental data for the surrounding environment. The LiDAR device may disable the active channel and/or passive listening channel to prevent the use of low-resolution and/or inaccurate measurements of reflectance and/or range. In some embodiments, based on detecting a blockage, the LiDAR device may switch active channels to confirm the detection of the blockage. As a part of switching active channels, the channel initially configured as active channel may be configured as a passive listening channel (or as inactive) and a channel initially configured as the passive listening channel (or inactive) may be configured as the active channel. After switching, based on the active channel emitting an optical signal and monitoring for return signal(s) reflecting from surfaces in the surrounding environment, the passive listening channel may be configured to monitor for a return signal from the window as described herein to detect a blockage at the LiDAR device. The LiDAR device may require confirmation of the blockage detection from more than one configuration of an active channel and a passive listening channel.

In some embodiments, based on not detecting a blockage, the LiDAR device may continue to operate to determine range data for the surrounding environment. As described herein, the active channel of the LiDAR device may be configured to periodically switch after a duration of time (e.g., from one operating period to the next). Based on switching active channels, the channel initially configured as the active channel may be configured as the passive listening channel (or inactive) and a channel initially configured as the passive listening channel (or inactive) may be configured as the active channel. In some cases, channels of the LiDAR device may switch from active to passive or passive to active in a sequential order. After switching, based on the active channel emitting an optical signal and monitoring for return signal(s) reflecting from surfaces in the surrounding environment, the passive listening channel may be configured to monitor for a return signal from the window as described herein to detect a blockage at the LiDAR device.

Blockage Detection Method

Figure 4:
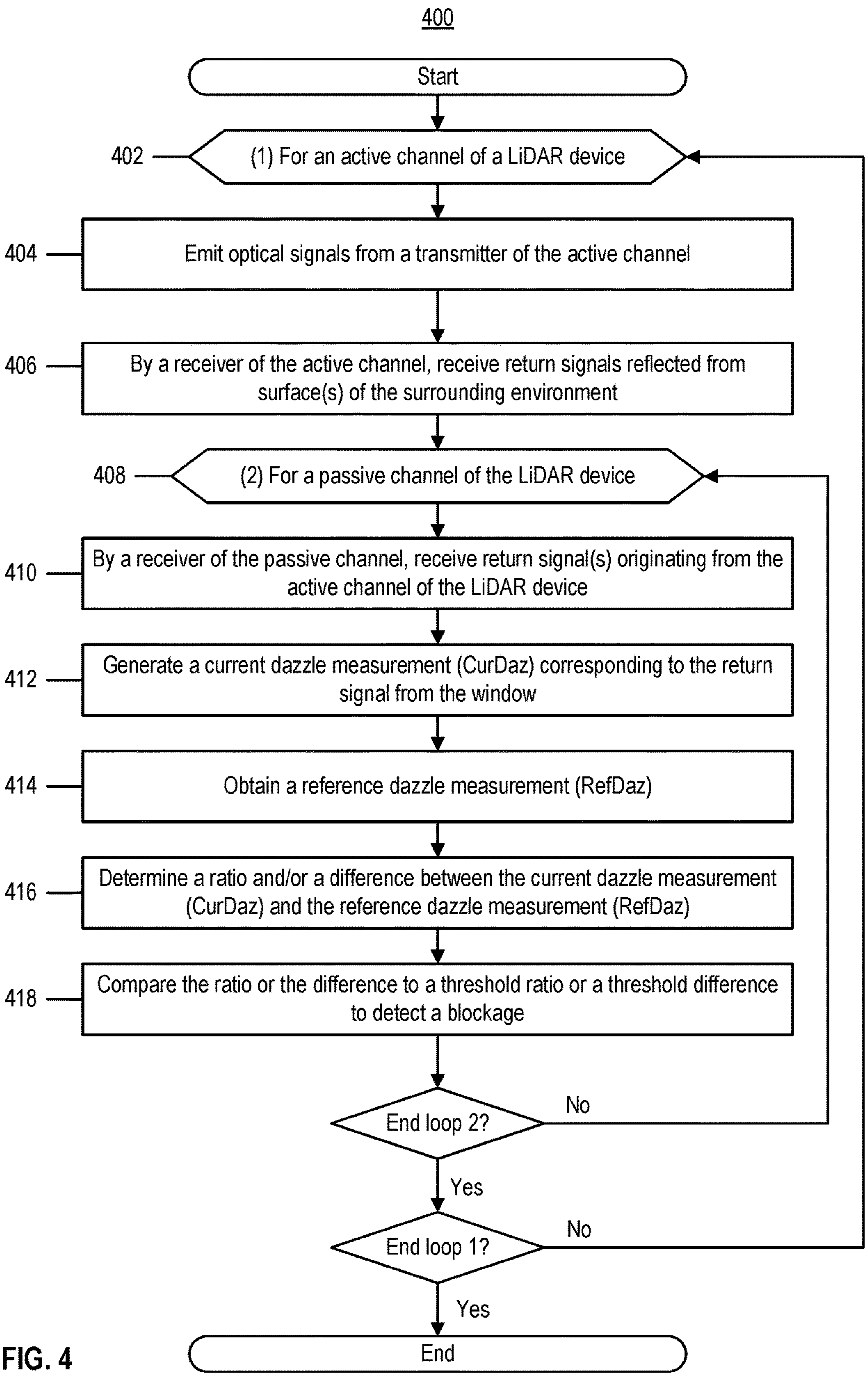
FIG. 4 shows a flowchart of method for detecting blockages at a LiDAR device via passive channel listening, in accordance with some embodiments.

In some embodiments, as described herein, a LiDAR device may execute a method as a part of operation to detect blockages via passive channel listening. Referring to FIG. 4, an embodiment of a method 400 for detecting blockages at a LiDAR device via passive channel listening is shown. The detection method 400 may be suitable for detecting blockages at a window of a LiDAR device in an operating environment. As indicated by the loop header 402, steps 404 and 406 of the method 400 may be performed for an active channel of the LiDAR device. Likewise, as indicated by the loop header 408, steps 460-468 of the method 400 may be performed for a configured passive listening channel of the LiDAR device. For simplicity, the following paragraphs describe steps 404 and 406 with reference to a single active channel of the LiDAR device, and describe steps 460-468 with reference to a single passive listening channel of the LiDAR device. One of ordinary skill in the art will appreciate that the method 400 may be executed by any suitable configuration of an active channel and a passive listening channel of a particular LiDAR device. As an example, the method 400 may be executed using an active and passive listening channel pair that is the most sensitive for detecting blockages at the LiDAR device. t In step 404, during an operating period of the LiDAR device, a transmitter of an active channel of the LiDAR device may emit an optical signal to detect surface(s) of the surrounding operating environment. The LiDAR device may emit the optical signal at a configured power level that is known to the passive listening channel of the LiDAR device and/or to a computing system coupled to and/or included with the LiDAR device (e.g., control & data acquisition module 108 and/or data analysis & interpretation module 109) that is configured to control and/or execute the method 400.

In step 406, during the operating period, a receiver of the active channel may receive return signals reflected from the window of the LiDAR device and/or surface(s) in the surrounding operating environment. If a blockage is present at the LiDAR device's window, the receiver may only receive return signal(s) reflecting from the window. If a blockage is not present at the LiDAR device's window, the receiver may receive return signal(s) reflecting from objects and/or surfaces in the surrounding environment. The receiver may monitor for return signals during a listening period as described herein. The LiDAR device may determine range information (and, optionally, reflectance information) for the surfaces associated with the received return signals as described herein.

In step 410, during the operating period, the passive listening channel may receive one or more return signal(s) originating from the emitted optical signal of the active channel. As described herein, the passive listening channel may be configured to monitor for return signals in a duration of time corresponding to the listening period of the active channel.

In step 412, the LiDAR device may generate a measurement of the current dazzle (CurDaz) produced by the active channel's emission of optical signal(s) based on attributes of the detected return signals reflected from the window of the LiDAR device. For example, the LiDAR device may determine an area under the intensity peak associated with the return signal from the window. The area under the intensity peak may be determined based on integration techniques as described herein. In some cases, the LiDAR device may determine a width (i.e. pulse width) of the intensity peak and/or a magnitude of the intensity peak in place of (or in addition to) the area under the intensity peak as described herein.

In step 414, the LiDAR device may obtain (e.g., receive) data indicating a measurement of reference dazzle (RefDaz) corresponding to the same channel configuration (e.g., power level, active channel, and passive listening channel) used to generate the measurement of the current dazzle (CurDaz). In some cases, the measurement of reference dazzle may include the reference area under the intensity peak produced by the reference dazzle. In some cases, the measurement of reference dazzle may include the reference width of the intensity peak and/or the reference magnitude of the intensity peak produced by the reference dazzle.

In step 416, the LiDAR device may determine a ratio for the area under the peak produced by the current dazzle ($A_{CD}$) and the reference area under the peak ($A_{RD}$) (e.g., where the ratio may be calculated as ratio=$A_{CD}/A_{RD}$). In some cases, a difference (e.g., delta) may be determined for the area under the peak produced by the current dazzle ($A_{CD}$) and the reference area under the peak ($A_{RD}$) (e.g., where the difference may be calculated as difference=$A_{CD}-A_{RD}$) in place of (or in addition to) the ratio as described herein. In other cases, the LiDAR device may determine a ratio (or difference) between the width or magnitude of the peak produced by the current dazzle and the reference width or reference magnitude as described above with respect to the area under the peak produced by the current dazzle and the reference area.

In step 418, the determined ratio (of step 416) may be compared to a configured threshold ratio. If the determined ratio exceeds the configured threshold ratio, the LiDAR device may determine a blockage is present at the LiDAR device. If the determined ratio is below the configured threshold ratio, the LiDAR device may determine a blockage is not present at the LiDAR device. If the determined ratio is equal to the configured threshold ratio, the LiDAR device may determine a blockage is present or is not present at the LiDAR device based on a configuration of the LiDAR device. In some cases, a determined difference may be compared to a configured threshold difference in place of (or in addition to) the ratio comparison as described herein. The determined difference may be compared to a configured threshold difference in accordance with the comparison of the determined ratio and the configured threshold ratio as described above. Based on detecting a blockage, the LiDAR device may generate an alert and/or send a notification to a user (or external computing system) to indicate that a blockage is present at the LiDAR device.

The detection method 400 may be performed by the LiDAR device. In some embodiments, a system that includes the LiDAR device may communicate with a detection module within the LiDAR device (e.g., a program resident in a computer-readable storage medium within the LiDAR device and executed by a processor within the LiDAR device) and/or with the control and data acquisition modules 108 of the LiDAR device's channels to control the LiDAR device to perform steps 412, 414, 416, and 418 as described above.

The detection method 400 may be performed by the LiDAR device when one or more channel(s) of the LiDAR device enter an active state (e.g., from a passive state). The detection method 400 may be performed by the LiDAR device when one or more channel(s) of the LiDAR device switch from the active state to the passive state or from the passive state to the active state. During an operating period, the LiDAR device may sequentially switch channels between passive channels and active channels. By performing the detecting method 400 based on channel activation and/or switching, the LiDAR device may seek to detect blockages continuously and/or periodically during operation.

The above-mentioned reference data (e.g., area under the intensity peak, width (e.g., pulse width) of the intensity peak, and/or magnitude of the intensity peak), which characterize the reference intensity value(s) associated with return signals reflecting from the window when no blockage is present, may be obtained using any suitable technique, including the method described herein.

Further Description of Some Embodiments

Figure 5:
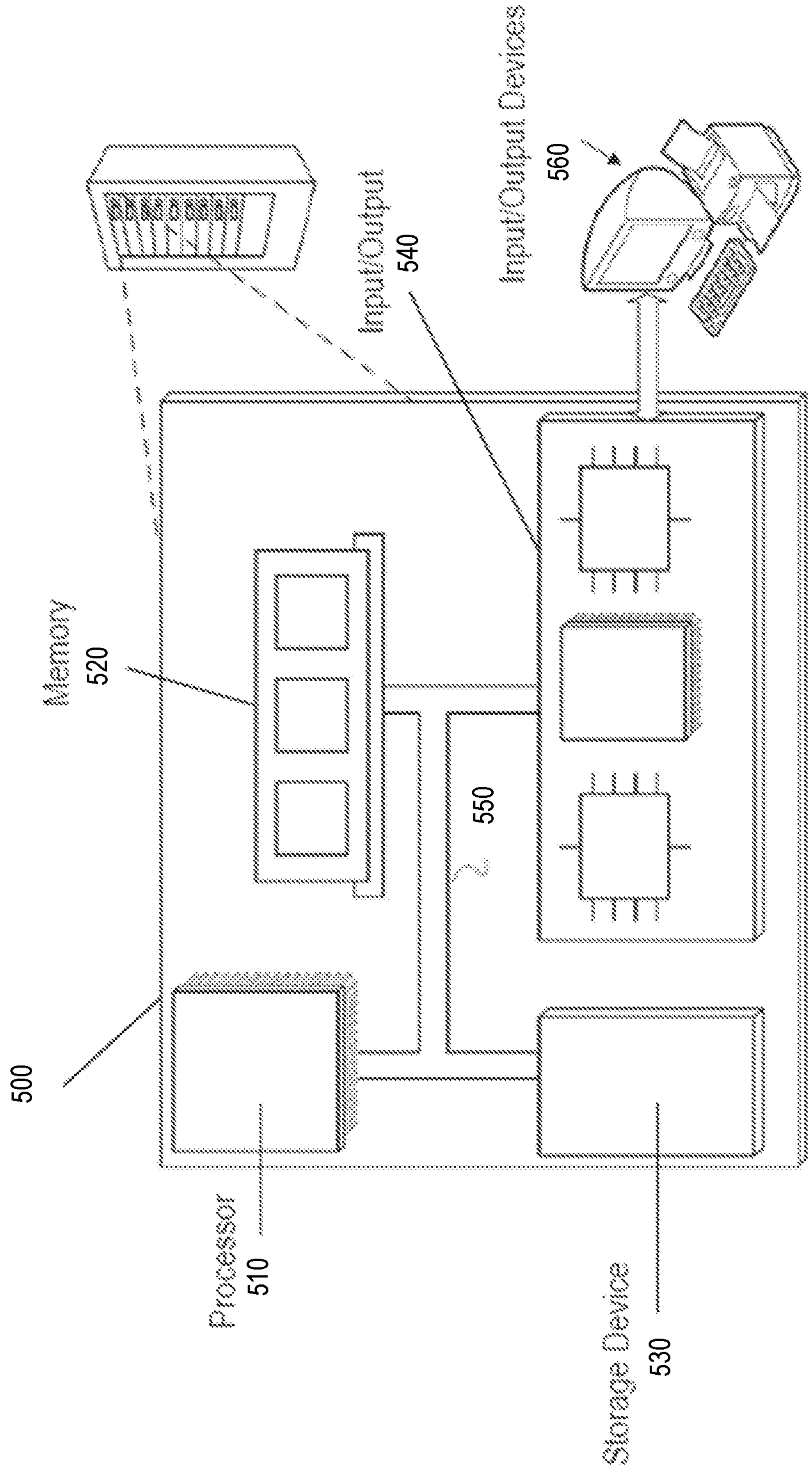
FIG. 5 is a block diagram of an example computer system.

FIG. 5 is a block diagram of an example computer system 500 that may be used in implementing the technology described in this document. General-purpose computers, network appliances, mobile devices, or other electronic systems may also include at least portions of the system 500. The system 500 includes a processor 510, a memory 520, a storage device 530, and an input/output device 540. Each of the components 510, 520, 530, and 540 may be interconnected, for example, using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530.

The memory 520 stores information within the system 500. In some implementations, the memory 520 is a non-transitory computer-readable medium. In some implementations, the memory 520 is a volatile memory unit. In some implementations, the memory 520 is a non-volatile memory unit.

The storage device 530 is capable of providing mass storage for the system 500. In some implementations, the storage device 530 is a non-transitory computer-readable medium. In various different implementations, the storage device 530 may include, for example, a hard disk device, an optical disk device, a solid-date drive, a flash drive, or some other large capacity storage device. For example, the storage device may store long-term data (e.g., database data, file system data, etc.). The input/output device 540 provides input/output operations for the system 500. In some implementations, the input/output device 540 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 560. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 530 may be implemented in a distributed way over a network, for example as a server farm or a set of widely distributed servers, or may be implemented in a single computing device.

Although an example processing system has been described in FIG. 5, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Figure 6:
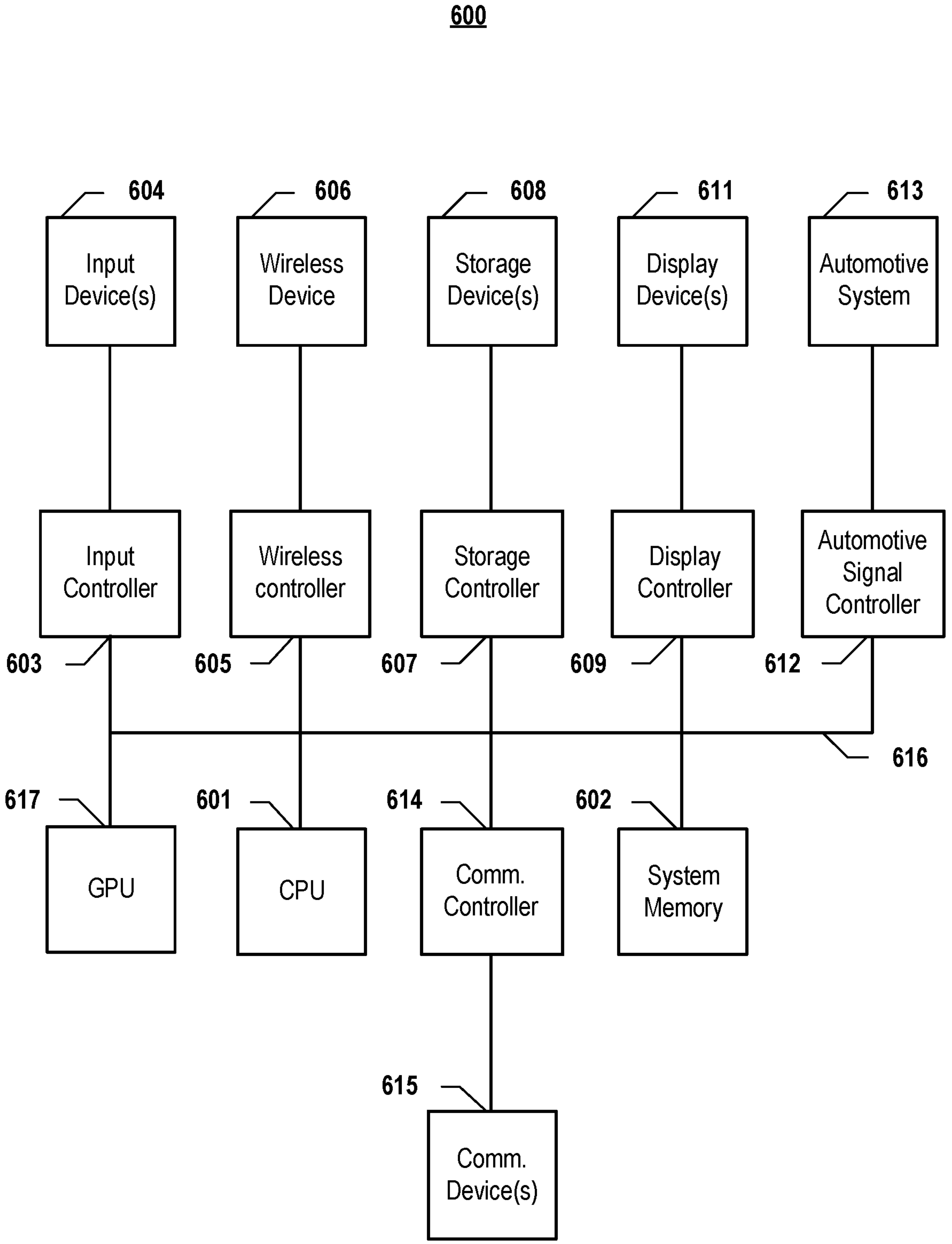
FIG. 6 is a block diagram of a computing device/information handling system, in accordance with some embodiments.

FIG. 6 depicts a simplified block diagram of a computing device/information handling system (or computing system) according to embodiments of the present disclosure. It will be understood that the functionalities shown for system 600 may operate to support various embodiments of an information handling system—although it shall be understood that an information handling system may be differently configured and include different components.

As illustrated in FIG. 6, system 600 includes one or more central processing units (CPU) 601 that provides computing resources and controls the computer. CPU 601 may be implemented with a microprocessor or the like, and may also include one or more graphics processing units (GPU) 617 and/or a floating point coprocessor for mathematical computations. System 600 may also include a system memory 602, which may be in the form of random-access memory (RAM), read-only memory (ROM), or both.

A number of controllers and peripheral devices may also be provided, as shown in FIG. 6. An input controller 603 represents an interface to various input device(s) 604, such as a keyboard, mouse, or stylus. There may also be a scanner controller 605, which communicates with a scanner 606. System 600 may also include a storage controller 607 for interfacing with one or more storage devices 608 each of which includes a storage medium such as magnetic tape or disk, or an optical medium that might be used to record programs of instructions for operating systems, utilities, and applications, which may include embodiments of programs that implement various aspects of the techniques described herein. Storage device(s) 608 may also be used to store processed data or data to be processed in accordance with some embodiments. System 600 may also include a display controller 609 for providing an interface to a display device 611, which may be a cathode ray tube (CRT), a thin film transistor (TFT) display, or other type of display. The computing system 600 may also include an automotive signal controller 612 for communicating with an automotive system 613. A communications controller 614 may interface with one or more communication devices 615, which enables system 600 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of some embodiments may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Some embodiments may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that some embodiments may further relate to computer products with a non-transitory, tangible computer-readable medium that have computer code thereon for performing various computer-implemented operations. The media and computer code may be those specially designed and constructed for the purposes of the techniques described herein, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Some embodiments may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the techniques described herein. One skilled in the art will also recognize that a number of the elements described above may be physically and/or functionally separated into sub-modules or combined together.

Terminology

The phraseology and terminology used herein is for the purpose of description and should not be regarded as limiting.

Measurements, sizes, amounts, etc. may be presented herein in a range format. The description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as 10-20 inches should be considered to have specifically disclosed subranges such as 10-11 inches, 10-12 inches, 10-13 inches, 10-14 inches, 11-12 inches, 11-13 inches, etc.

Furthermore, connections between components or systems within the figures are not intended to be limited to direct connections. Rather, data or signals between these components may be modified, re-formatted, or otherwise changed by intermediary components. Also, additional or fewer connections may be used. The terms "coupled," "connected," or "communicatively coupled" shall be understood to include direct connections, indirect connections through one or more intermediary devices, and wireless connections.

Reference in the specification to "one embodiment," "preferred embodiment," "an embodiment," "some embodiments," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

Furthermore, one skilled in the art shall recognize that: (1) certain steps may optionally be performed; (2) steps may not be limited to the specific order set forth herein; (3) certain steps may be performed in different orders; and (4) certain steps may be performed concurrently.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A light detection and ranging (LiDAR) blockage detection method comprising:

emitting, by a first channel of a plurality of channels of a LiDAR device, an optical signal toward a configured position on a housing of the LiDAR device, the first channel comprising a first transmitter configured to emit the optical signal and a first receiver configured as active;

operating a second channel of the plurality of channels in a second mode, the second channel comprising a second transmitter and a second receiver, wherein in the second mode the second transmitter is configured as active and the second receiver is configured as active;

switching the second channel of the plurality of channels to a first mode, the first mode characterized by the second transmitter being configured as inactive and the second receiver being configured as active;

receiving, by the second channel of the plurality of channels, a return signal originating from the optical signal, while the second channel is operating in the first mode; and determining, based on a comparison of data derived from the return signal and data derived from a reference signal, whether a blockage is present at the configured position on the housing.

2. The method of claim 1, wherein the second channel is located adjacent to the first channel.

3. The method of claim 1, wherein the second channel is located proximal to the first channel.

4. The method of claim 1, wherein the housing comprises a window.

5. The method of claim 1, further comprising:

emitting, by the first channel, a second optical signal toward the configured position; and receiving, by the second channel, the reference signal, wherein the reference signal originates from the second optical signal and is reflected from the housing of the LiDAR device.

6. The method of claim 1, wherein determining whether a blockage is present at the configured position on the housing comprises:

determining a first area under an intensity peak of the return signal;

determining a second area under an intensity peak of the reference signal;

comparing a ratio or a difference between the first area and the second area to a threshold; and if the ratio or the difference is greater than the threshold, determining the blockage is present at the configured position on the housing.

7. The method of claim 1, wherein determining whether a blockage is present at the configured position on the housing comprises:

determining a first magnitude of an intensity peak of the return signal;

determining a second magnitude of an intensity peak of the reference signal;

comparing a ratio or a difference between the first magnitude and the second magnitude to a threshold; and if the ratio or the difference is greater than the threshold, determining the blockage is present at the configured position on the housing.

8. The method of claim 1, wherein determining whether a blockage is present at the configured position on the housing comprises:

determining, based on an intensity of a portion of the return signal being greater than a threshold intensity, a first width of an intensity peak of the return signal;

determining, based on an intensity of a portion of the reference signal being greater than the threshold intensity, a second width of an intensity peak of the reference signal;

comparing a ratio or a difference between the first width and the second width to a threshold; and if the ratio or the difference is greater than the threshold, determining the blockage is present at the configured position on the housing.

9. The method of claim 1, further comprising:

based on determining the blockage is present at the configured position on the housing, generating a notification comprising an indication of the blockage.

10. A LiDAR system comprising:

a plurality of channels, a first channel of the plurality of channels configured to emit an optical signal toward a configured position on a housing of the LiDAR system, the first channel comprising a first transmitter configured to emit the optical signal and a first receiver configured as active; and a second channel of the plurality of channels configured to receive a return signal originating from the optical signal, the second channel comprising a second transmitter and a second receiver, the second channel operating in a first mode characterized by the second transmitter being configured as inactive and the second receiver being configured as active, wherein upon switching to a second mode, the second transmitter is configured as active and the second receiver is configured as active; and a processing device configured to determine, based on a comparison of data derived from the return signal and data derived from a reference signal, whether a blockage is present at the configured position on the housing.

11. The system of claim 10, wherein the second channel is located adjacent to the first channel.

12. The system of claim 10, wherein the second channel is located proximal to the first channel.

13. The system of claim 10, wherein the housing comprises a window.

14. The system of claim 10, wherein:

the first channel is configured to emit a second optical signal at the configured position;

the second channel is configured to receive the reference signal; and the reference signal originates from the second optical signal and is reflected from the housing of the LiDAR system.

15. The system of claim 10, wherein the processing device is configured to determine whether a blockage is present at the configured position on the housing by:

determining a first area under an intensity peak of the return signal;

determining a second area under an intensity peak of the reference signal;

comparing a ratio or a difference between the first area and the second area to a threshold; and if the ratio or the difference is greater than the threshold, determining the blockage is present at the configured position on the housing.

16. The system of claim 10, wherein the processing device is configured to determine whether a blockage is present at the configured position on the housing by:

determining a first magnitude of an intensity peak of the return signal;

determining a second magnitude of an intensity peak of the reference signal;

comparing a ratio or a difference between the first magnitude and the second magnitude to a threshold; and if the ratio or the difference is greater than the threshold, determining the blockage is present at the configured position on the housing.

17. The system of claim 10, wherein the processing device is configured to determine whether a blockage is present at the configured position on the housing by:

determining, based on an intensity of a portion of the return signal being greater than a threshold intensity, a first width of an intensity peak of the return signal;

determining, based on an intensity of a portion of the reference signal being greater than the threshold intensity, a second width of an intensity peak of the reference signal;

comparing a ratio or a difference between the first width and the second width to a threshold; and if the ratio or the difference is greater than the threshold, determining the blockage is present at the configured position on the housing.

18. The system of claim 10, wherein, based on a determination that the blockage is present at the configured position on the housing, the processing device is configured to generate a notification comprising an indication of the blockage.

* * * * *